US008706031B2

(12) United States Patent  
Nowlin et al.

(10) Patent No.: US 8,706,031 B2  
(45) Date of Patent: Apr. 22, 2014

(54) METHOD FOR SWITCHING THE USE OF A SHARED SET OF WIRELESS I/O DEVICES BETWEEN MULTIPLE COMPUTERS

(75) Inventors: Dan H. Nowlin, Hillsboro, OR (US); Hari K. Tadepalli, Phoenix, AZ (US); Paul R. Zurcher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 2712 days.

(21) Appl. No.: 09/991,089

(22) Filed: Nov. 13, 2001

(65) Prior Publication Data

US 2003/0092437 A1    May 15, 2003

(51) Int. Cl.
*H04B 7/00* (2006.01)

(52) U.S. Cl.
USPC ..... 455/41.2; 455/41.3; 455/41.1; 455/456.2; 455/569.1

(58) Field of Classification Search
USPC .................. 455/420, 560, 418, 419
See application file for complete search history.

(56) References Cited

U.S. PATENT DOCUMENTS

2002/0128041 A1*  9/2002  Parry ........................... 455/560  
2003/0083056 A1*  5/2003  Wu et al. ..................... 455/420

\* cited by examiner

*Primary Examiner* — Charles Appiah  
*Assistant Examiner* — Randy Peaches  
(74) *Attorney, Agent, or Firm* — Trop, Pruner & Hu, P.C.

(57) ABSTRACT

A method for switching the use of a shared set of wireless I/O devices between multiple computers. The method of one embodiment comprises receiving a wireless request at a first machine to switch control of a device to a second machine. Control of the device is relinquished at said first machine. A token is transferred from the first machine to the second machine. Wireless control of the device is established at the second machine.

17 Claims, 11 Drawing Sheets

FIG. 1 - PRIOR ART

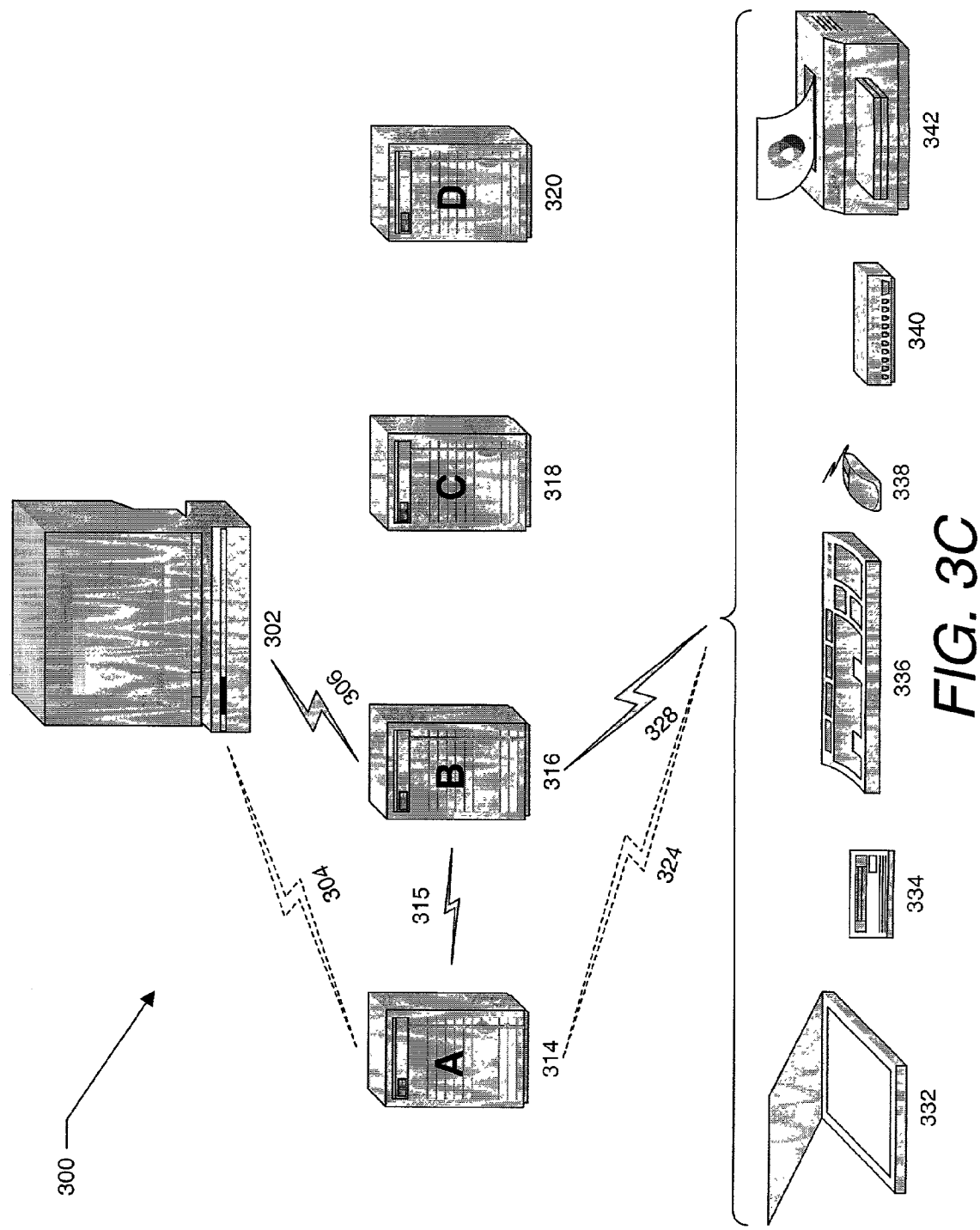

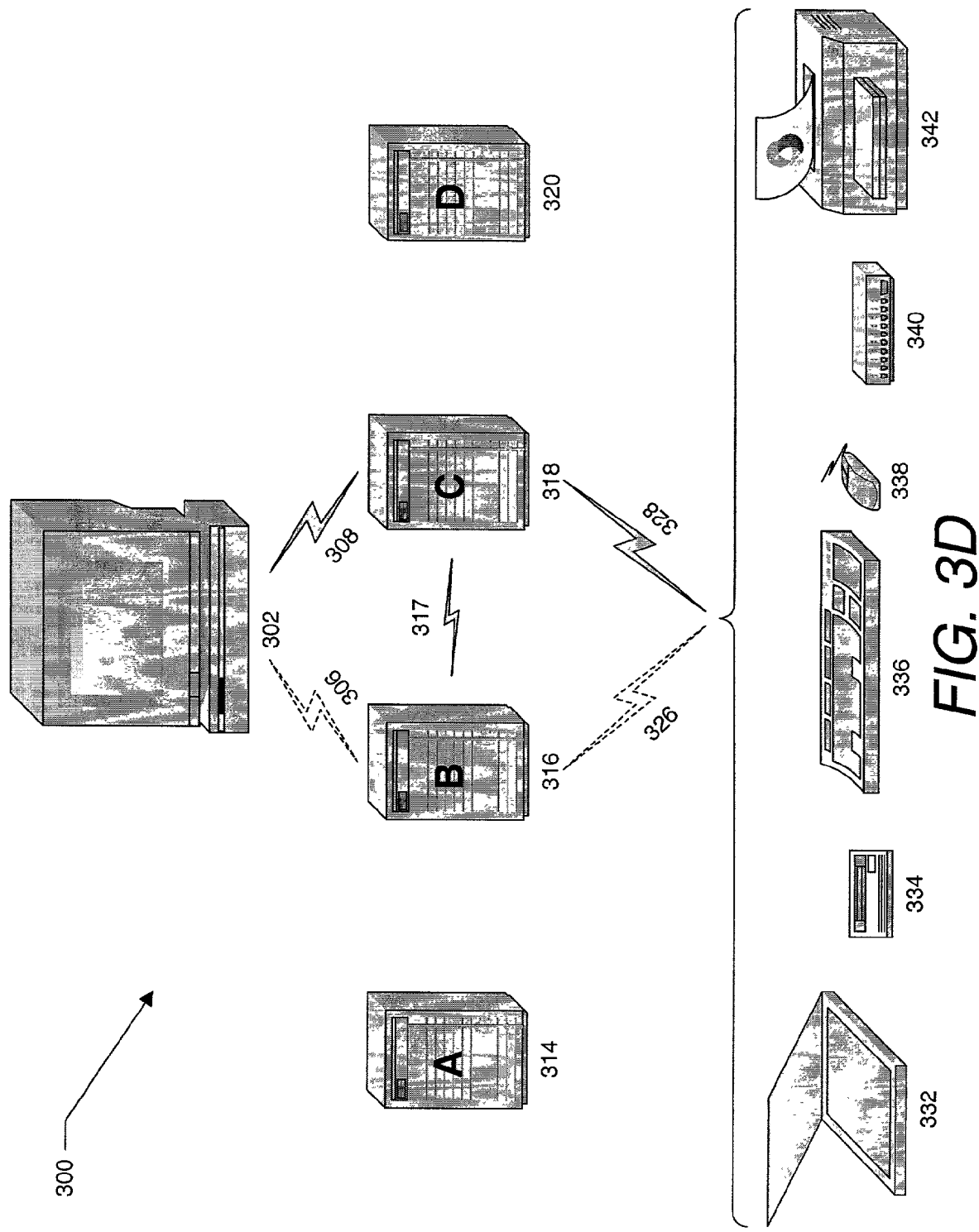

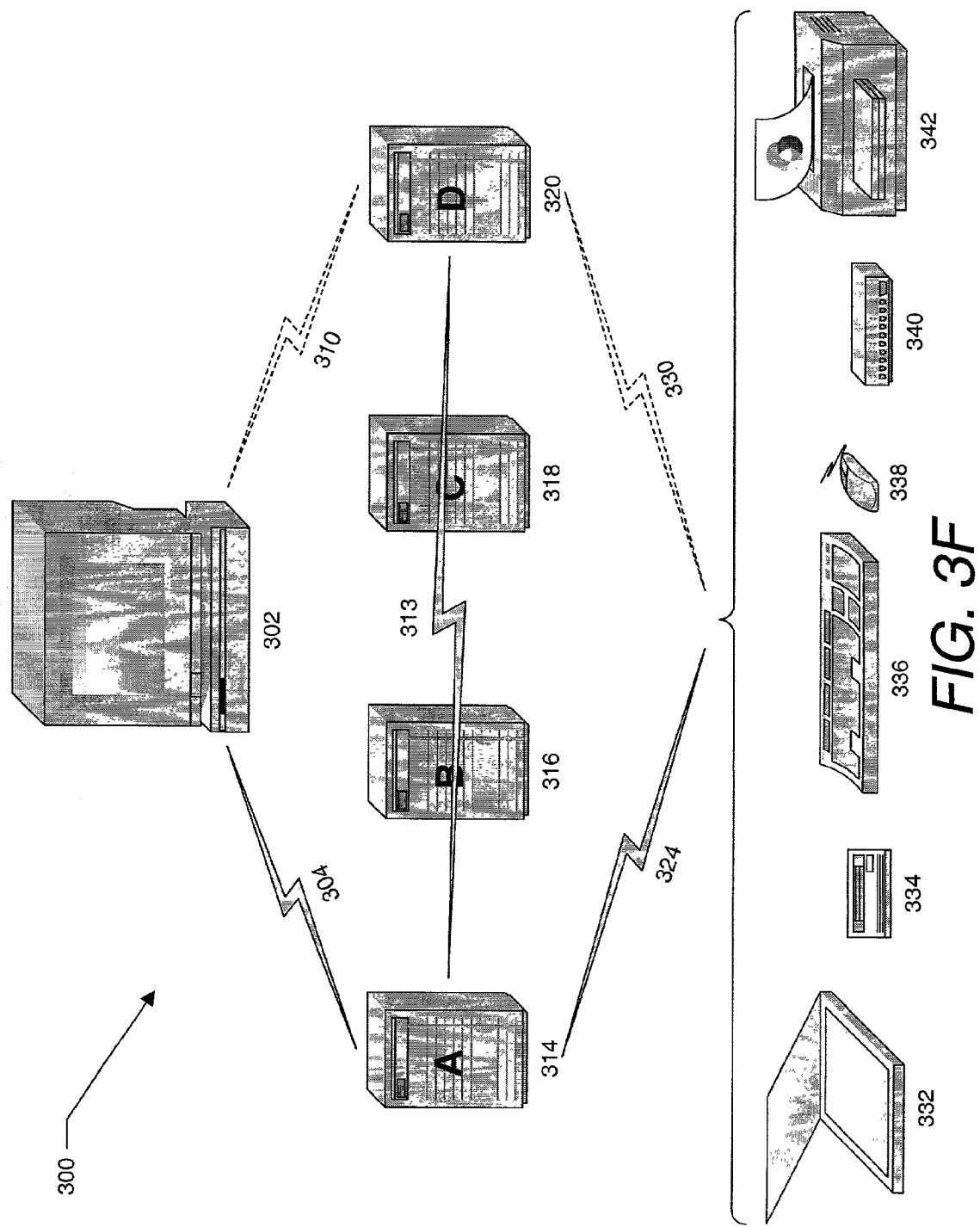

METHOD FOR SWITCHING THE USE OF A SHARED SET OF WIRELESS I/O DEVICES BETWEEN MULTIPLE COMPUTERS

FIELD OF THE INVENTION

The present invention relates generally to the field of microprocessors and computer systems. More particularly, the present invention relates to a method for switching the use of a shared set of wireless input/output (I/O) devices between multiple computers.

BACKGROUND OF THE INVENTION

The processing capabilities of computers have increased the efficiency and productivity of workers in a wide spectrum of professions. As the costs of purchasing and owning a computer continues to drop, many people and companies now have multiple computers available for use by a single individual. This scenario is quite normal in locations such as an engineering testing lab, a stockbroker trading desk, and a customer service support desk. Thus redundant devices and components may be present on a single desk or room. As a result, some users are interested in reducing the clutter of devices and the cost savings from not purchasing redundant devices.

FIG. 1 is block diagram of a prior art system 100 for sharing input/output (I/O) devices. This system includes three computers X 112, Y 122, and Z 132. Each computer X 112, Y 122, Z 132, is connected by cable to its keyboard 114, 124, 134, and mouse 116, 126, 136, respectively. The computers X 112, Y 122, Z 132, are connected to a switch box 110. The switchbox 110 allows the computers X 112, Y 122, Z 132 to share some I/O devices. A monitor 106 is connected with cables to the switchbox 110. In some prior art systems, the computers X 112, Y 122, Z 132, also share a keyboard and mouse if those devices are also wired to the switchbox 110. Such a switchbox is known as a keyboard/video/mouse (KVM) switchbox. Depending on the switch settings on the switchbox 110, one of the computers X 112, Y 122, Z 132, can control the monitor 106. By physically adjusting the settings on the switchbox 110, control can be changed to another computer.

Thus the sharing I/O devices in existing prior art systems can be cumbersome. Both the computers and the devices have to be connected by cables to physical switchboxes. The use of cables to transfer signals limits the capabilities of the system. The computers and devices to be connected to a switchbox has to be within a cable length range. If the component is physically too far away from the switchbox, the cable will not reach. Furthermore, a switchbox can have a limited number of ports in which to receive device connectors. Anytime a device is to be added or subtracted from the system, the switchbox has to be accessed and serviced. Similarly, a switch of control requires the physical switching of settings at the switchbox.

BRIEF DESCRIPTION OF THE DRAWINGS

The present invention is illustrated by way of example and not limitations in the figures of the accompanying drawings, in which like references indicate similar elements, and in which:

FIG. 3C is an illustration of the transfer of control for the shared set of wireless devices from the a computer to a second computer in the system;

FIG. 3D is an illustration of the transfer of control for the shared set of wireless devices between the second and third computers;

FIG. 3F is an illustration of the transfer of control for the shared set of wireless devices from the fourth computer back to the first computer;

DETAILED DESCRIPTION

Figure 1:
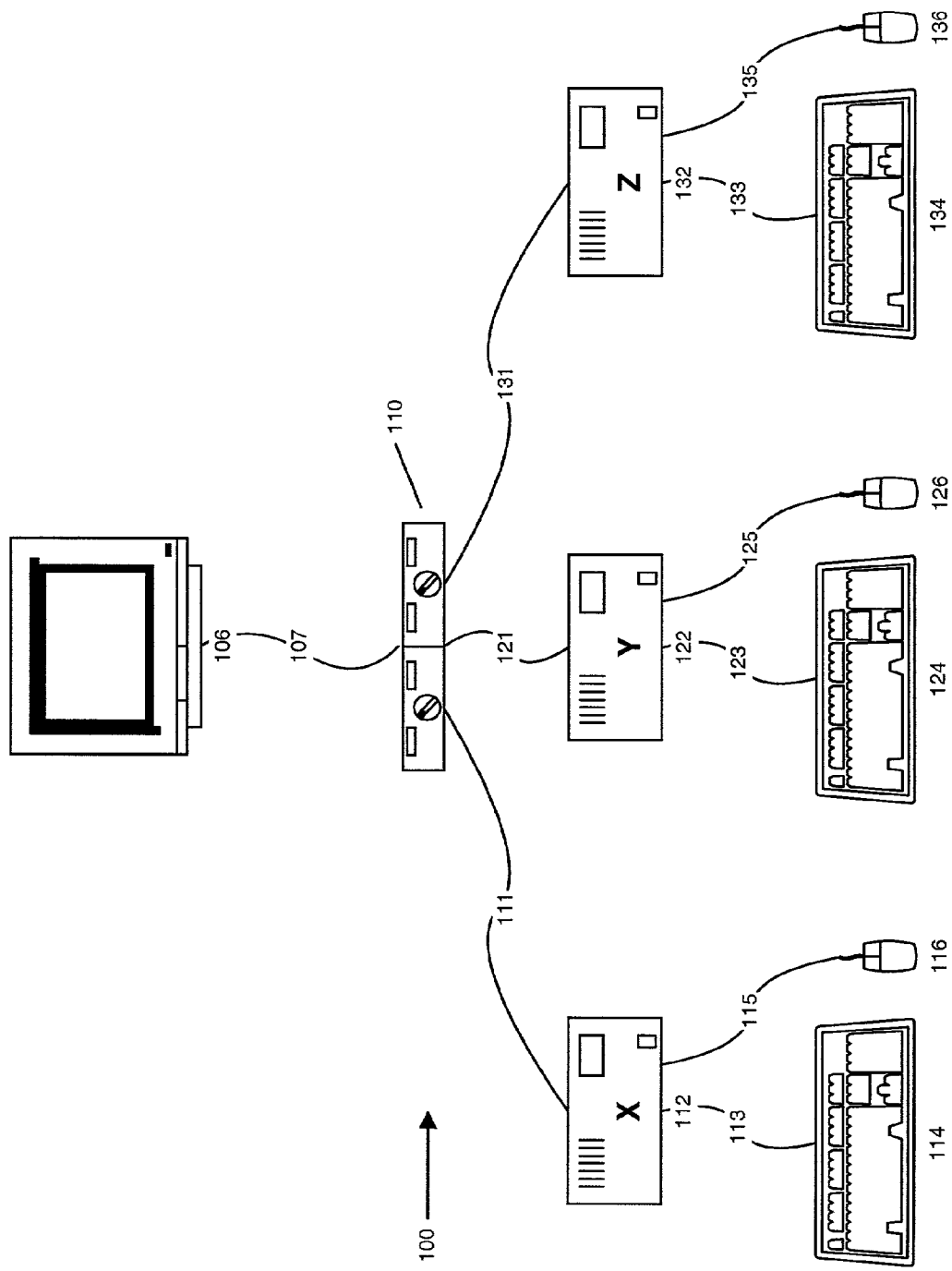
FIG. 1 is block diagram of a prior art system for sharing I/O devices.

A method for switching the use of a shared set of wireless I/O devices between multiple computers is disclosed. The embodiments described herein are described in the context of a desktop computer, but are not so limited. Although the following embodiments are described with reference to a desktop computer, other embodiments are applicable to other computing devices, including portable computers, appliances, and set top boxes. The same techniques and teachings of the present invention can easily be applied to other types of computers or computing devices that can benefit from the shared use of wireless devices.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

Many computer users are interested in reducing the clutter of wires and electronic devices in the office and home. For example, such clutter is undesirable at monitoring desks for security personnel and nursing stations attending multiple patients. The first step to clear up some desk space has been to share redundant devices among multiple machines. Thus extra equipment can be removed. However, existing methods of sharing devices entail the use of switchboxes and the running of large numbers of cables and wires. Presently, all switchbox solutions that allow shared use of I/O devices use wires as the transport mechanism for data and control signals. The number of computers that can be supported by a wired switchbox is also limited by the number of physical ports available on the switchbox itself. The cumbersome setup to share I/O devices in existing environments limits the effectiveness of the shared environment. Furthermore, the sharing is bound by the physical lengths of cables and the reach of the user. Every time a control switch is desired, the user has to physically access and manipulate the switchbox.

Embodiments in accordance with the present invention entail a wireless solution for the sharing of I/O devices and peripherals among multiple computers. Unlike a wired environment, the devices that can be accessed in a wireless solution is limited by the signal propagation range. Thus a wider operating range is possible. Furthermore, a wider array of newer I/O devices are available. The wireless technique of the present environment can provide for a cleaner and safer user environment. With the use of techniques of the present invention, most of the switchbox functionality can be accomplished through software in some embodiments. Thus a physical switchbox and wiring is no longer necessary to have shared control of I/O devices. In using embodiments of the present invention, considerable cost savings can also be achieved where more than one computer is in use by a single person.

The present invention describes a new mechanism to share a set of I/O devices among several machines. The switching mechanism of these embodiments are software based. The computers are capable of wireless communications via some type of wireless protocol such as Bluetooth™, IEEE 802.11, etc. Furthermore, the types of I/O devices shared are wireless peripherals that are compatible with the wireless protocols used in the system. Through the use of software, a user can create an association between all the computers and the I/O devices in the system. This software resides and operates on each computer within the system. The software performs as a switch mechanism that allows for the shared use of I/O devices like monitors, keyboards, mice, joysticks, etc.

Once an association between the machines and devices is established, one particular computer in the association has access to any of the I/O devices in the system at a single time. Through some user action, such as the entering of a special key sequence, the software can be requested to give up access and control of the I/O devices. The software also sends a token in the form of a wireless signal or packet to the next computer in the association. When the software in this next computer receives the token, its access and control to the set of I/O devices is enabled. A user can repeat this "next computer" cycle until the desired computer has the token and thus control of the peripheral devices. In some embodiments, an on screen message can be displayed to indicate which computer is presently activated for user control.

Figure 2:
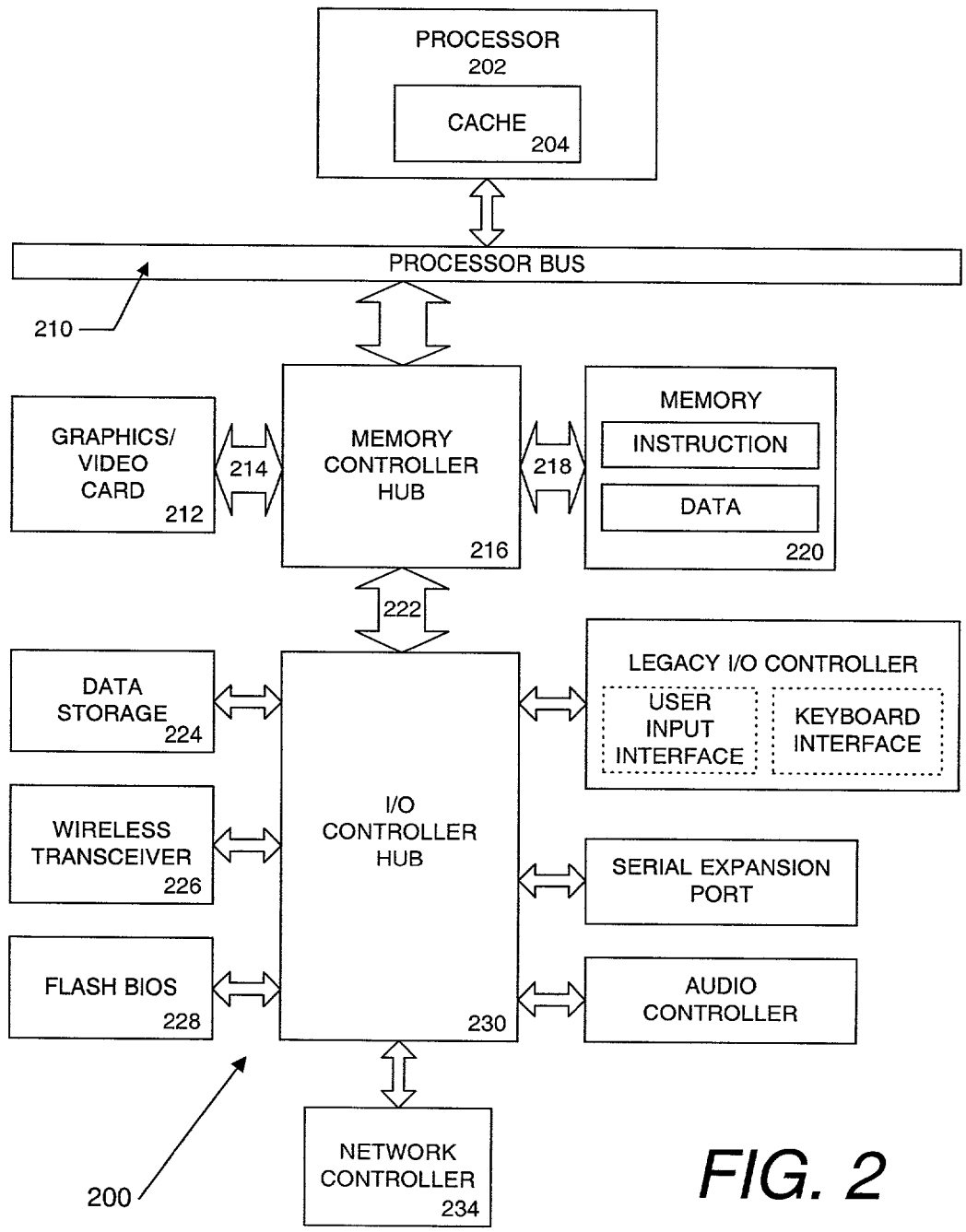
FIG. 2 is a block diagram of a computer system having a capability for switching the use of a shared set of wireless I/O devices in accordance with the present invention.

Referring now to FIG. 2, an exemplary computer system 200 is shown. System 200 includes an arrangement of components to employ a method to share wireless I/O devices in accordance with the present invention, such as in the embodiment described herein. System 200 is representative of processing systems based on the PENTIUM® III, PENTIUM® 4, Itanium™, StrongARM™ microprocessors available from Intel Corporation of Santa Clara, Calif., although other systems (including PCs having other microprocessors, engineering workstations, set-top boxes and the like) may also be used. In one embodiment, sample system 200 may be executing a version of the WINDOWS™ operating system available from Microsoft Corporation of Redmond, Wash., although other operating systems and graphical user interfaces such as UNIX, Linux, and embedded operating systems, for example, may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include network computers (NetPC), set-top boxes, network hubs, wide area network (WAN) switches, or any other system which use I/O devices.

FIG. 2 is a block diagram of a computer system 200 having a capability for switching the use of a shared set of wireless I/O devices in accordance with the present invention. The processor 202 includes an internal cache memory 204. The present embodiment is described in the context of a single processor desktop or server system, but alternative embodiments can be included in a multiprocessor system. System 200 is an example of a hub architecture. The computer system 200 includes a processor 202 that processes data signals. The processor 202 can be a complex instruction set computer (CISC) microprocessor, a reduced instruction set computing (RISC) microprocessor, a very long instruction word (VLIW) microprocessor, a processor implementing a combination of instruction sets, or other processing device, such as a digital signal processor, for example. The processor 202 is coupled to a processor bus 210 that transmits data signals between the processor 202 and other components in the system 200. The elements of system 200 perform their conventional functions well known in the art.

System 200 includes a memory 220. Memory 220 can be a dynamic random access memory (DRAM) device, a static random access memory (SRAM) device, flash memory device, or other memory device. Memory 220 can store instructions and/or data represented by data signals that can be executed by the processors 202. A cache memory 204 can reside inside the processor 202 that stores data signals stored in memory 220. Alternatively, in another embodiment, the cache memory can reside external to the processor 202.

A system logic chip 216 is coupled to the processor bus 210 and memory 220. The system logic chip 216 in the illustrated embodiment is a memory controller hub (MCH). The processor 202 communicates to the MCH 216 via a processor bus 210. The MCH 216 provides a high bandwidth memory path 218 to memory 220 for instruction and data storage and for storage of graphics commands, data and textures. The MCH 216 directs data signals between the processor 202, memory 220, and other components in the system 200 and bridges the data signals between processor bus 210, memory 220, and system I/O 222. In some embodiments, the system logic chip 216 provides a graphics port for coupling to a graphics controller 212. The MCH 216 is coupled to memory 220 through a memory interface 218. The graphics card 212 is coupled to the MCH 216 through an Accelerated Graphics Port (AGP) interconnect 214.

System 200 uses a proprietary hub interface bus 222 to couple the MCH 216 to the I/O controller hub (ICH) 230. The ICH 230 provides direct connections to some I/O devices. Some examples are the audio controller, firmware hub (flash BIOS) 228, data storage 224, legacy I/O controller containing user input and keyboard interfaces, a serial expansion port such as Universal Serial Bus (USB), and a network controller 234. The data storage device 224 can comprise a hard disk drive, a floppy disk drive, a CD-ROM device, a flash memory device, or other mass storage device. System 200 also includes a power supply that can both source and sink current to the above mentioned components.

For the embodiment of a processor system 200 in FIG. 2, a wireless transceiver 226 is also coupled to the ICH 230. The wireless transceiver is capable of receiving and transmitting data from the local system 200 through the ICH 230 as well as using wireless signals to receive and transmit data from remote systems. Control of the transceiver 226 resides with device driver software and memory 220, which communicates with firmware software and memory residing on the wireless transceiver 226. The processor 202 can execute instructions from memory 220 that cause the processor to send data to and request from the wireless transceiver. Application software and the operating system, working through the wireless transceiver device driver, can interface the wireless transceiver 226. The wireless transceiver enables the system 200 to communicate with other computers and devices that have wireless capability.

Figure 3A:
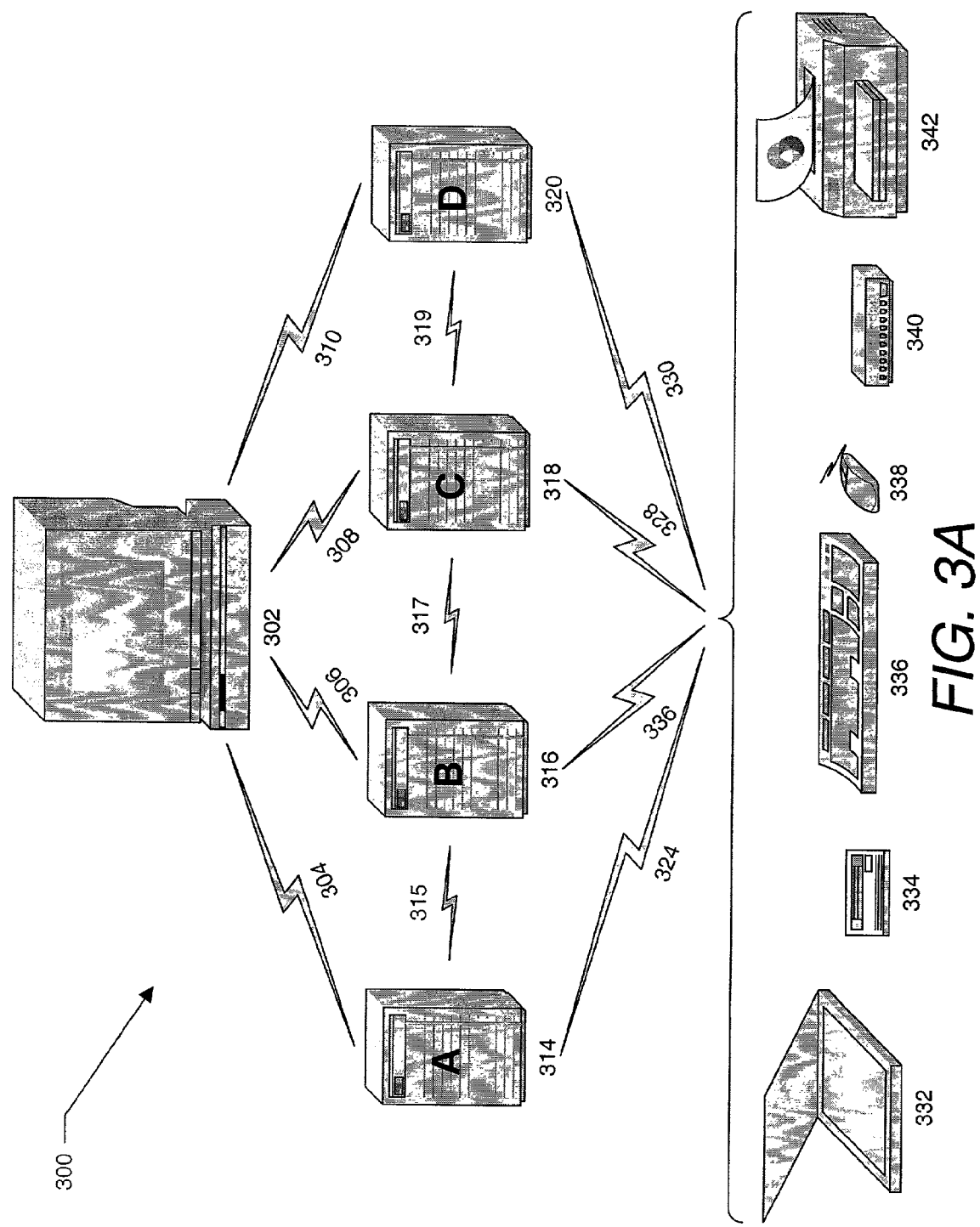
FIG. 3A is an illustration of a system of computers that share a set of wireless devices.

A method of switching the use of a shared set of wireless I/O devices in accordance with one embodiment of the present invention will be explained with respect to illustrations shown in FIGS. 3A-3F. FIG. 3A is an illustration of a system 300 of computers that share a set of wireless devices. The system of this example has four computers A 314, B 316, C 318, D 320, that can share a number of I/O devices among them. In other embodiments, the numbers and types of computers and devices can vary widely. The types of I/O devices that can be shared include a scanner 332, an external data storage device 334, a keyboard 336, a mouse 338, a modem 340, and a printer 342. Furthermore, a video display such as a computer monitor 302 is also shared among the computers 314, 316, 318, 320, in this example. The I/O devices 332, 334, 336, 338, 340, 342, shown in FIG. 3A are examples of different types of devices that can be shared. However, embodiments of the present invention are not limited to these devices as such. Other devices that can be shared include joysticks, game controllers, MP3 music players, microphones, speakers, digital cameras, virtual display devices, PDA synchronization cradles, and other types of I/O devices that may have wireless capability. Each of these I/O devices are wireless enabled and have wireless transceivers to send and receive wireless signals. Depending on the type of device, the transceiver may be built into the device itself or coupled externally to the device.

The I/O devices 332, 334, 336, 338, 340, 342, of this example communicate with the computers 314, 316, 318, 320, via wireless transmissions 324, 336, 328, 330. For simplicity, the wireless transmissions 324, 336, 328, 330, are shown as single communication link between each computer A 314, B 316, C 318, D 320, and the group of wireless devices. However, it is understood that each I/O device 332, 334, 336, 338, 340, 342, can communicate directly with each computer 314, 316, 318, 320, and does not have to operate via a common transmission point. For example, if computer A 314 is in control, there can be wireless transmissions 324 happening with some of the I/O devices. For instance, the keyboard 336 and mouse 338 can both be sending user input data to computer A 314 concurrently. Meanwhile, the printer 342 can be also be receiving print data from computer A 314 while those communications are occurring. Thus, even though the transmissions between the computer A 314 and the keyboard 336, mouse 338, and printer 342 are illustrated as a single communication link 324, multiple communications links are actually present.

Similarly, each computer 314, 316, 318, 320, can transmit display data to video monitor 302 via communication links 304, 306, 308, 310. Furthermore, each of the computers 314, 316, 318, 320, are capable of communicating wirelessly with the other computers 314, 316, 318, 320, in the system 300. For this embodiment, one of the computers in the system functions as the master computer. This master is the one that has control of all the I/O devices 332, 334, 336, 338, 340, 342, and graphical display 302. When a switch of control is made, this master machine passes control and ownership of the display 302 and I/O devices 332, 334, 336, 338, 340, 342, to one of the other computers active in the system 300. The new computer in control becomes the new master and the old master becomes a slave machine. The use of the term "master" in these description are in reference to a machine in control of other devices, i.e. a computer in control of I/O devices. Similarly, the term "slave" in reference to the other computers in the system that can take control of the I/O devices does not necessarily mean that the master computer is in control of these other machines. The term "slave" is used in this case to describe the other machines in the system as not being in control of the I/O devices.

Figure 3B:
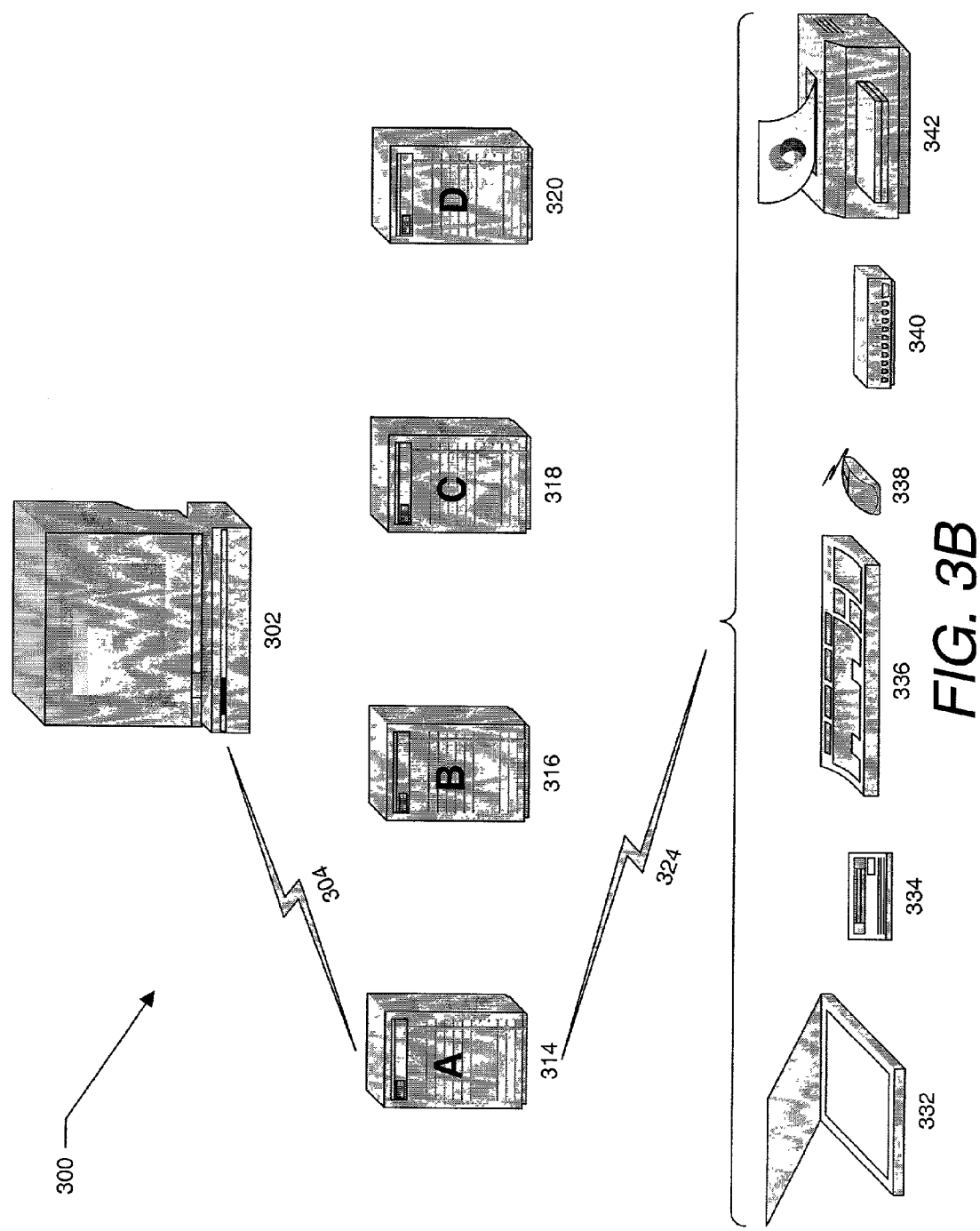
FIG. 3B is an illustration of a first computer in control of a shared set of wireless devices.

FIG. 3B is an illustration of a first computer 314 in control of a shared set of wireless devices 332, 334, 336, 338, 340, 342. Computer A 314 is the master of the system 300. The wireless devices 332, 334, 336, 338, 340, 342, within range of computer A 314 are under the control of the master The other computers B 316, C 318, D 320, may be in a operating mode, but not in active use and has no control over the system devices 332, 334, 336, 338, 340, 342. For another embodiment, the slave machines may be in a standby or idle state. Computer A 314 drives video data to the computer video display 302 through wireless transmissions 304. Computer A 314 also wirelessly transmits and receives control and data signals with the peripheral devices 332, 334, 336, 338, 340, 342. In this present configuration, computer A 314, monitor 302, and the wireless devices 332, 334, 336, 338, 340, 342, operate together just like a normal standalone computer system.

For this embodiment, control of the system devices 332, 334, 336, 338, 340, 342, can be serially transferred to each of the computers A 314, B 316, C 318, and D 320. The switching of control is effected by entering a key combination by the user on the keyboard 336. The switching request is transmitted from the keyboard 336 to the master. Upon receiving the control switch request, the master processes the request and transfers control to the new master. For instance, a user may press the "CTRL-ALT-PgDn" keys on the keyboard 336 to switch control from the master computer to the next computer in the sequence. In this implementation, control can be switched from computer A 314 to computer B 316, then from computer B 316 to computer C 318, from computer C 318 to computer D 320, and then from computer D 320 back to computer A 314. For alternative embodiments, control can be switched from the master to any other computer in the system 300. Thus if computer A 314 is the master, a user can switch control from computer A 314 to computer B 316, C 318, or D 320, by entering the keys for the desired machine. The user may also be able to program a key combination to switch control to a specific computer. Thus a user might program a combination such as "CTRL-ALT-F1" to switch control to computer A 314, "CTRL-ALT-F2" to switch control to computer B 316, "CTRL-ALT-F3" to switch control to computer C 318, and "CTRL-ALT-F4" to switch control to computer D 320. Furthermore, the keyboard 336 of another embodiment has special keys built into the console for switching control of the system I/O devices 332, 334, 336, 338, 340, 324, from one computer to another.

FIG. 3C is an illustration of the transfer of control for the shared set of wireless devices 332, 334, 336, 338, 340, 342, from the a first computer 314 to a second computer 316 in the system 300. In this instance, a request to switch control is issued to the master, computer A 314. Computer A 314 receives the transmission and processes the request. The communication links 324 to the I/O devices 332, 334, 336, 338, 340, 342, are terminated, as is the data link 304 to display 302. The present master, computer A 314 switches control via communication link 315 to the next master, computer B 316. Some type of token can also be propagated from computer A 314 to computer B 316. Token arbitration occurs upon a user request to switch the master. Computer A 314 becomes a slave machine until being selected to take control again and no longer has control of the display 302 or the wireless I/O devices 332, 334, 336, 338, 340, 342. As computer B 316 becomes the new system master, computer B 316 initializes communication links 306, 326, to monitor 302 and the I/O devices 332, 334, 336, 338, 340, 342. Computer B 316 assumes control and begins normal system operations. Thus the wireless switch of control from computer A 314 to computer B 316 is completed.

FIG. 3D is an illustration of the transfer of control for the shared set of wireless devices 332, 334, 336, 338, 340, 342, between the second and third computers. A request to switch control is issued to computer B 316. Computer B 316 receives the transmission and processes the request. The communication links 326 to the I/O devices 332, 334, 336, 338, 340, 342, are terminated, as is the data link 306 to display 302. The present master, computer B 316 switches control via communication link 317 to the next master, computer C 318. Computer B 316 becomes a slave machine until being selected to take control again and no longer has control of the display 302 or the wireless I/O devices 332, 334, 336, 338, 340, 342. As computer C 318 becomes the new system master, computer C 318 initializes communication links 308, 328, to monitor 302 and the I/O devices 332, 334, 336, 338, 340, 342. Computer C 318 assumes control and begins normal system operations. The wireless switch of control from computer B 316 to computer C 318 is completed.

Figure 3E:
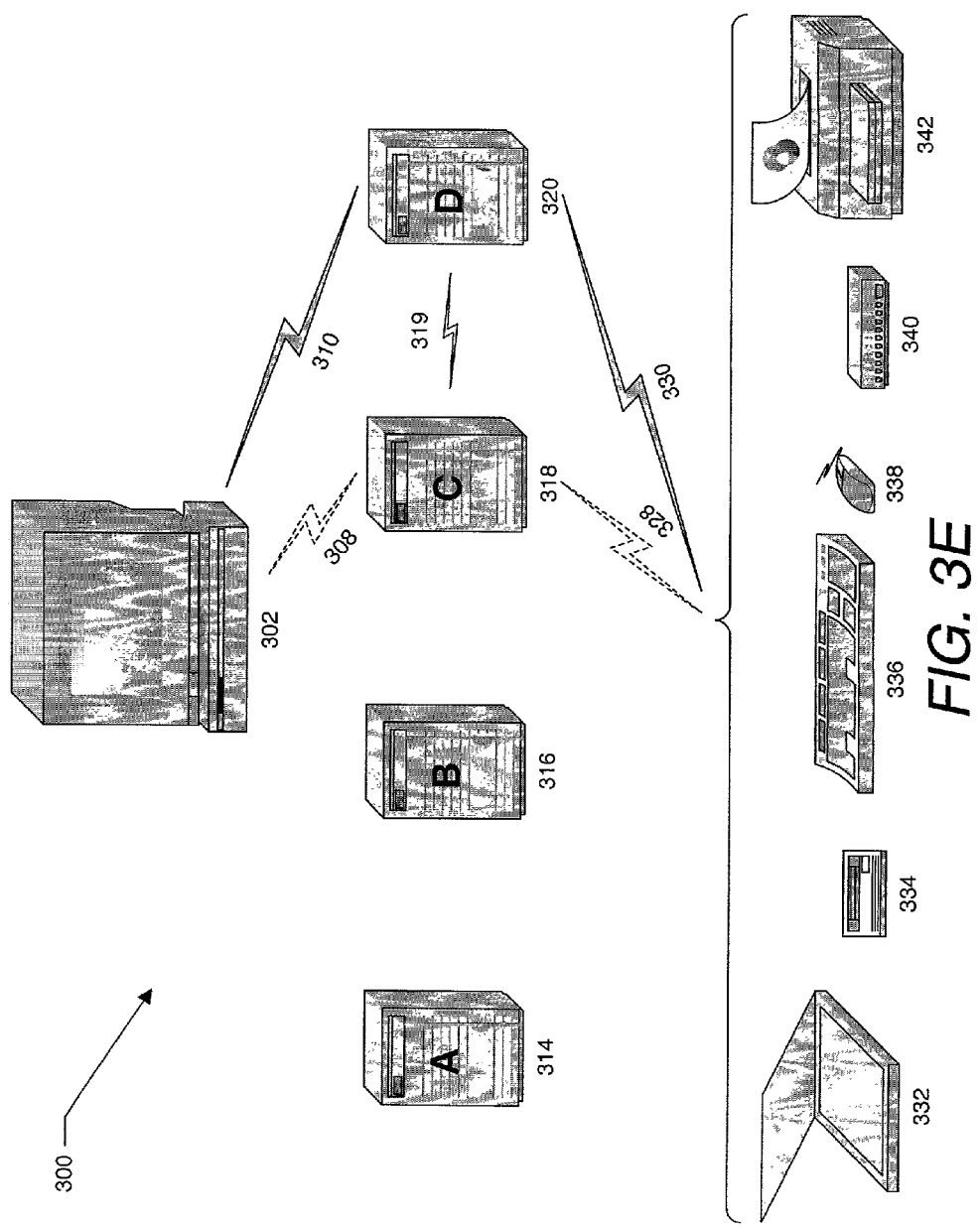
FIG. 3E is an illustration of the transfer of control for the shared set of wireless devices between the second and third computers.

FIG. 3E is an illustration of the transfer of control for the shared set of wireless devices 332, 334, 336, 338, 340, 342, between the third and fourth computers. Another request to switch control is issued. Computer C 318 receives the transmission and processes the request. The communication links 328 to the I/O devices 332, 334, 336, 338, 340, 342, are terminated, as is the data link 308 to display 302. The present master, computer C 318 switches control via communication link 319 to the next master, computer D 320. Computer C 318 becomes a slave machine until being selected to take control again and no longer has control of the display 302 or the wireless I/O devices 332, 334, 336, 338, 340, 342. As computer D 320 becomes the new master, computer D 320 initializes communication links 310, 330, to monitor 302 and the I/O devices 332, 334, 336, 338, 340, 342. Computer D 320 assumes control and begins normal system operations. The wireless switch of control from computer C 318 to computer D 320 is completed.

FIG. 3F is an illustration of the transfer of control for the shared set of wireless devices 332, 334, 336, 338, 340, 342, from the fourth computer back to the first computer. Yet another request to switch control is issued. Computer D 320 receives the transmission and processes the request. The communication links 330 to the I/O devices 332, 334, 336, 338, 340, 342, are terminated, as is the data link 310 to display 302. The present master, computer D 320 switches control via communication link 313 to the next master, computer A 314. Computer D 320 becomes a slave machine until being selected to take control again and no longer has control of the display 302 or the wireless I/O devices 332, 334, 336, 338, 340, 342. As computer A 314 becomes the new master, computer A 314 initializes communication links 304, 324, to monitor 302 and the I/O devices 332, 334, 336, 338, 340, 342. Computer A 314 assumes control and begins normal system operations. The wireless switch of control from computer D 320 to computer A 314 is completed.

Although these examples are described in the context of a system of computers, other embodiments can include other types of computing machines. For example, the computers in FIG. 3 can be replaced with workstations, set top boxes, game consoles, digital televisions, home appliances, palm devices, MP3 players, and any other type of computing device that uses I/O devices. Furthermore, the machines do not have to be of the same type, the system of some embodiments can comprise of various combinations of such computing devices.

For example, one embodiment of the present invention can be located in the living room of a home. A user would be able to configure the system such that an input device such as a keyboard can be shared among a set top box, a digital music player, a home alarm system, a video game machine, a web appliance, and a computer. Furthermore, those same machines can be configured to also share output devices such as speakers and digital display screens. Similarly, a user may have also enabled intelligent appliances in the kitchen of the same home to share input devices. Thus a person can use a single keyboard to access and control smart appliances like a coffee machine, microwave, refrigerator, and stove. This sharing of I/O devices among the different machines is accomplished through wireless switching of control. As the user indicates a desire to access each different machine, the requests to wireless switch control of the devices are handled.

Figure 4:
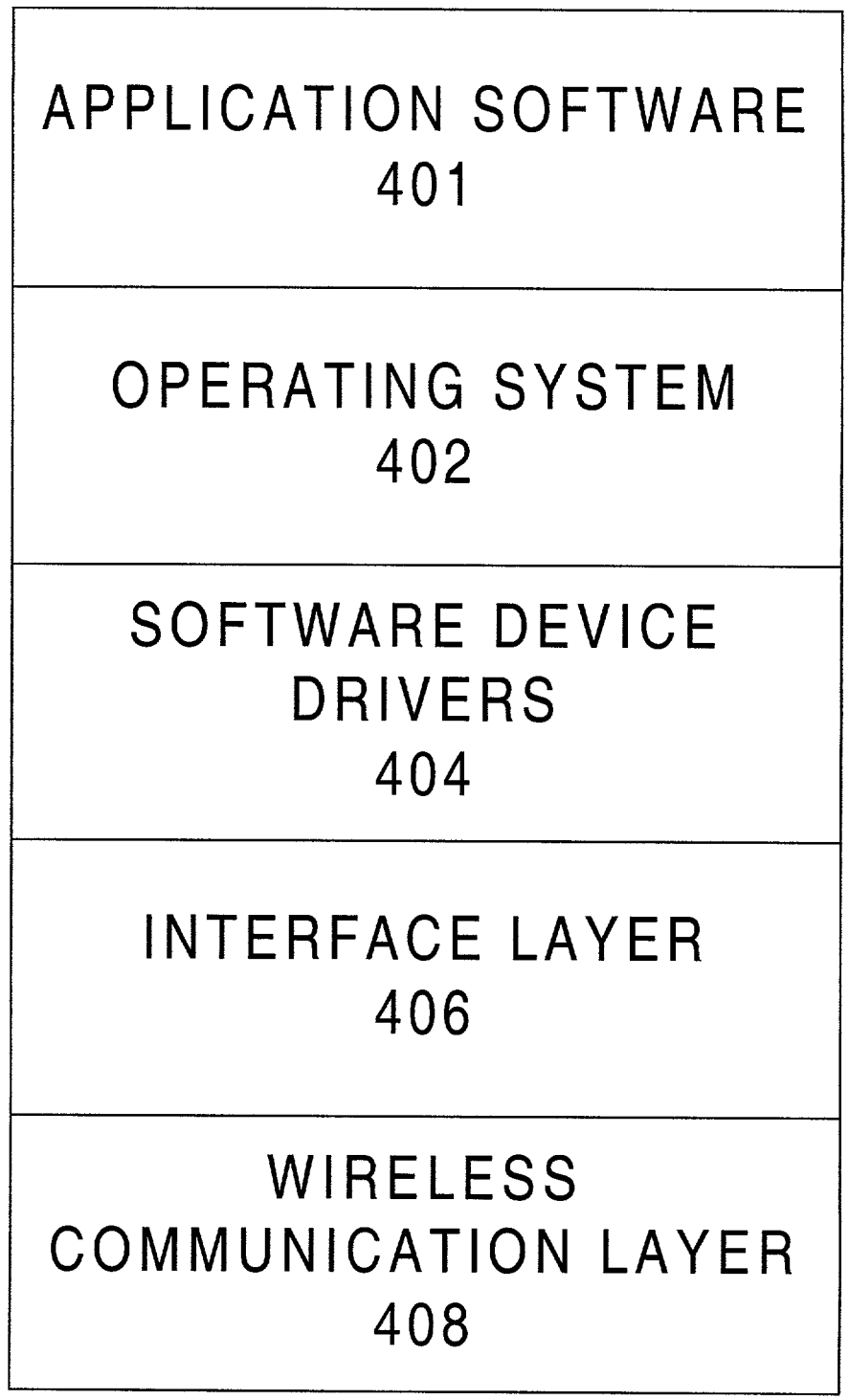
FIG. 4 is a block diagram of software stack residing in a machine that shares wireless devices.

FIG. 4 is a block diagram of software stack residing in a machine that shares wireless devices. The software stack shown in FIG. 4 comprises of application software 401, an operating system 402, software device drivers 404, an interface layer 406, and a wireless communication layer 408. For one embodiment, the upper level of the software stack in the computer is the operating system 402, such as a version of Microsoft Windows. The operating system 402 is generally the software interface between users and the system hardware. A user can input commands and data to the control software application, which in turn directs the inputs to the appropriate portions of the operating system 402. The next layer of software in the stack comprises of software device drivers 404. Device drivers 404 handles the software commands and instructions from the operating system 402 and issues the related control signals to hardware devices or controllers. Often, a device driver is provided by the hardware manufacturer and is specific to a particular hardware device. However, generic device drivers may also be available for devices such as keyboards and mice. These device drivers 404 can also be part of the operating system 402. In the software stack of this embodiment, a interface layer 406 exists between the software device drivers 404 and the wireless communication layer 408. This interface layer 406 enables the software device drivers 404 to use the wireless transceiver to communicate with wireless devices. The interface layer 406 translates commands and data packets from the device drivers 404 prepares them for transmission through the wireless communication layer 408. For a typical computer where the I/O devices are connected to the machine with wires, the device drivers 404 would communicate with the devices through circuitry, logic, and cables. Thus in a hardwired system, a physical switchbox is needed to connect the I/O devices to multiple computers. The user has to actually physically switch the connections or reconnect the cables in order to switch control. But in the wireless environments in accordance with the present invention, the device drivers 404 need to interact with wireless transceivers that can take the place of the circuitry, logic, and cables, and provide their functionality. In this example, the interface layer 406 ensures that the wireless data transmissions to and from the wireless transceiver of the computer are communicated to the system software. The wireless communication layer 408 controls the wireless transceiver and handles the transmissions. The wireless communication layer 408 can be designed to support one or more different types of wireless protocols, such as Bluetooth wireless technology and the IEEE 802.11 communication standard, for the devices that are present in the system. Because the I/O devices are communicating commands and data wirelessly, control of these wireless I/O devices can be switched wirelessly from one computer to the next.

Figure 5:
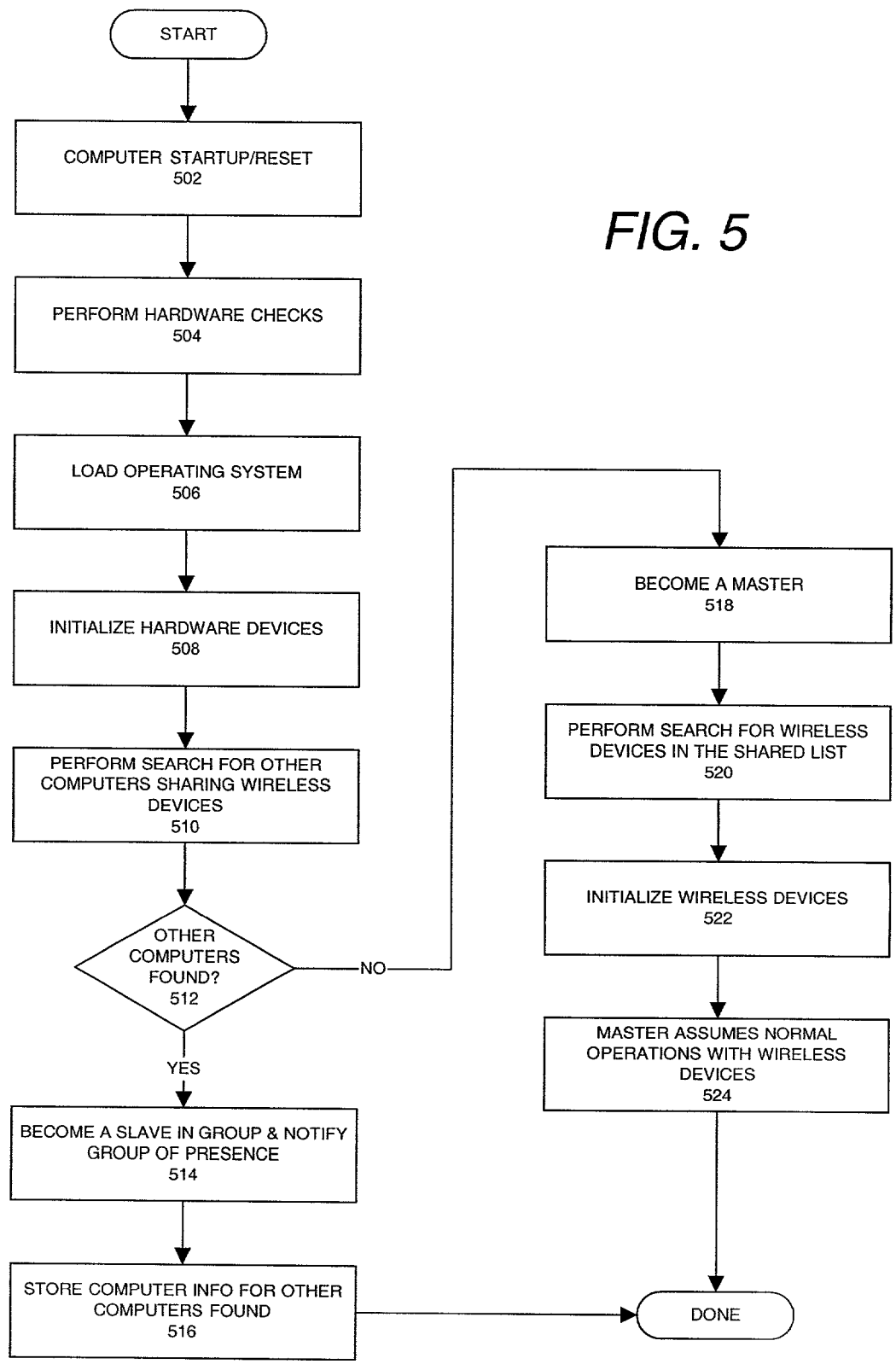
FIG. 5 is a flow chart showing one embodiment of a method to initialize a computer to share wireless devices.

FIG. 5 is a flow chart showing one embodiment of a method to initialize a computer to share wireless devices in accordance with the present invention. This example generally describes the initialization operation of a wireless switching mechanism of one embodiment during a system startup or reset. At block 502, the computer emerges from a system startup or reset sequence. The computer performs a hardware check of onboard components and devices at 504. This hardware check can entail a query to determine what components and devices are physically present in the computer and whether they are operational. For this embodiment, these onboard components and devices can include items physically connected to the motherboard like hard disk drives, floppy drives, CD ROM drives, bus controllers, wireless transceivers, and video cards. The operating system is loaded at block 506. At block 508, the hardware devices found during the hardware checks of block 504 are initialized and configured for use. The computer performs a search for other computers within communication range and are sharing wireless devices at block 510. At block 512, the computer checks whether any other computers were found. If no other computers are found at block 512, this master is the single computer in the system and sharing of the devices is not needed. Because the computer here is the first computer in the system, this computer becomes the master at block 518 by default.

This master computer goes on to search for wireless devices at block 520. The wireless transceiver sends out signals to determine what wireless I/O devices are present within range of the transceiver. At block 522, the wireless devices found are initialized. Once these I/O devices are configured, the computer can control and communicate with the devices. If no wireless devices are found, then the initialization procedure for the wireless portion is done and the computer proceeds on towards normal operations. The master completes the initialization procedure and assumes normal operations with the I/O devices at block 524.

But if other computers are found at block 512, then this computer becomes a slave in the group of computers at block 514 and notifies the group of the presence of this new slave machine. At block 516, the new slave computer stores the computer information for the other machines in the group that was found. The initialization procedure is done and the slave computer proceeds on towards normal operations.

Figure 6:
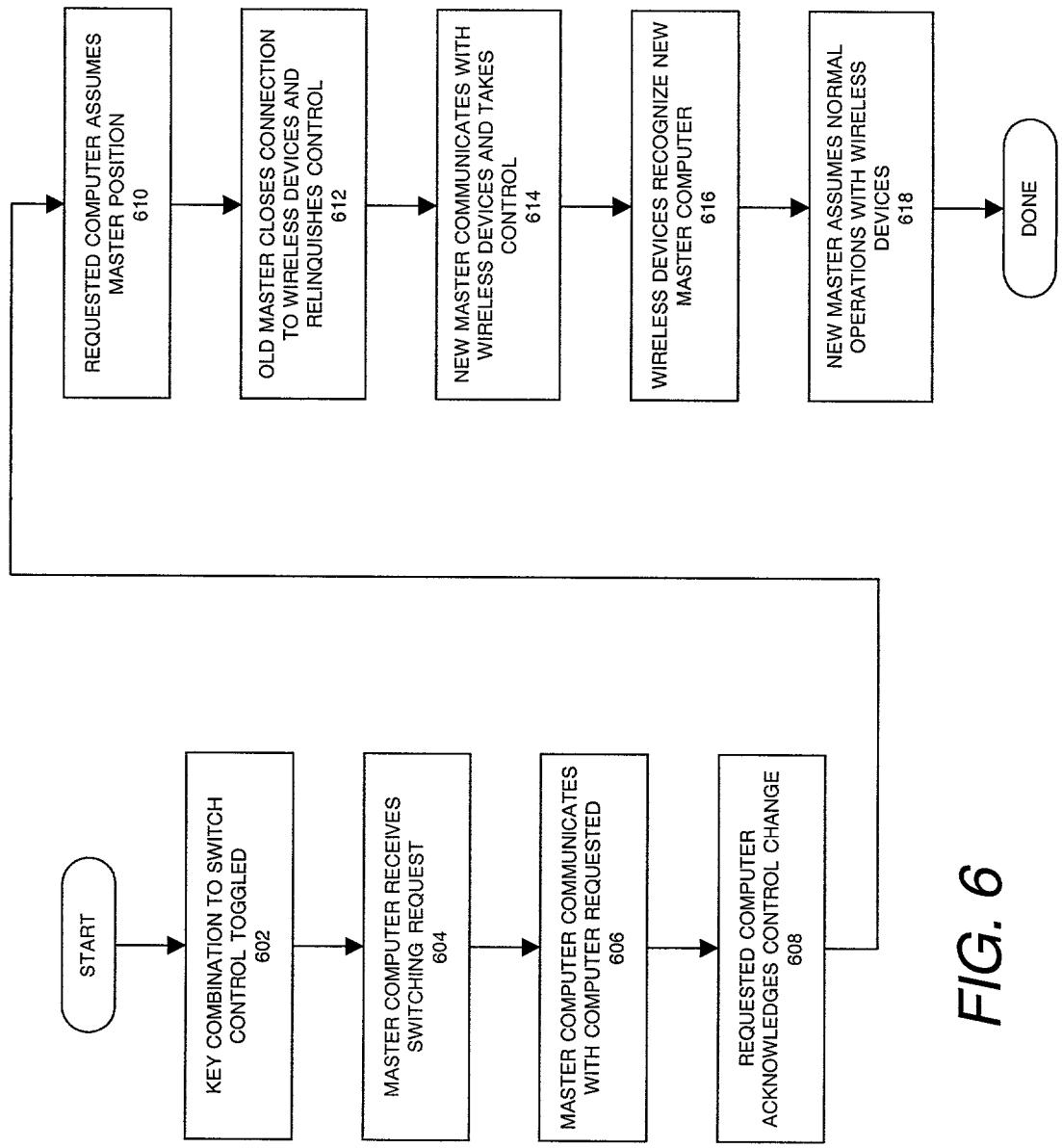
FIG. 6 is a flow chart showing one embodiment of a method in accordance with the present invention for switching the use of a shared set of wireless devices between multiple computers.

FIG. 6 is a flow chart showing one embodiment of a method in accordance with the present invention for switching the use of a shared set of wireless devices between multiple computers. At block 602, a key combination to request a switch of control is toggled. Various key combinations can be used in different embodiments. Similarly, some embodiments may include specially programmed buttons. The master computer receives the switching request via a wireless transmission at block 604. The master processes the request and prepares the transfer of control over the I/O devices. For one embodiment, a mechanism may be included to ensure that the prospective new master is permitted to use the wireless I/O devices currently attached to the present master and that the prospective new master can trust the I/O devices to render its inputs/outputs. Thus a switching request from the prospective new master computer may optionally be accompanied by a mutual challenge-response type authentication request. Failure on the part of either the current master or the prospective new master to authenticate the other computer will result in a disconnection between the computers. At block 606, the master computer communicates with the computer requested to be in control. For one embodiment, the master may transmit device settings or configurations to the requested computer. The requested computer at block 608 acknowledges the request for control change and that it should prepare for becoming master. At block 610, the requested computer assumes position of master. The old master becomes a slave machine in the system. Meanwhile, the old master at block 612 performs housekeeping operations with the I/O devices and closes the connection to those devices. The closing of the connections does not necessarily mean the old master is not in contact with the devices any more. Closing the connection indicates that the old master is not actively exchanging data and commands with the wireless I/O devices as in normal operations. However, the old master, like the other slaves in the system, can be monitoring the wireless transmissions in the vicinity of the system in order to detect requests to switch control. At block 614, the new master communicates with the wireless devices and takes control of the wireless I/O devices. The I/O devices recognize the new master computer at block 616. The new master assumes normal operations with the I/O devices at block 618. Some type of handshaking transmissions can also occur during the transmissions between the devices and computers.

Although the above examples describes the wireless switching of control to a set of wireless I/O devices between multiple computers in the context of a controller and logic, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:
a first instance of a software program resident and operating on a first machine executing in coordination with a second instance of the software program resident and operating on a second machine to:
receive a wireless request, at the first machine;
switch control of a device to a second machine;
relinquish control of said device at said first machine;
transfer a token from said first machine to said second machine; and
establish wireless control of said device at said second machine.

2. The method of claim 1 further comprising terminating wireless transmissions of commands and data between said first machine and said device.

3. The method of claim 2 further comprising initiating wireless transmissions of commands and data between said second machine and said device.

4. The method of claim 3 wherein said token represents a control key to indicate control ownership of said device.

5. The method of claim 4 wherein said wireless request is generated upon input of a predetermined key combination.

6. The method of claim 5 wherein said device is an input (I/O) device having capability for wireless communication.

7. The method of claim 6 further comprising wherein communications between said first machine, said second machine, and said devices are wireless and lack the presence of cable connections.

8. The method of claim 6 wherein said wireless transmissions and said wireless communication comply to Bluetooth wireless protocol.

9. The method of claim 8 wherein said first machine is a first computer and said second machine is a second computer.

10. The method of claim 9 wherein said I/O device is a keyboard.

11. The method of claim 9 wherein said I/O device is a mouse.

12. The method of claim 9 wherein said I/O device is a graphical display.

13. A system comprising:
a wireless input/output device, said wireless I/O device to be controlled through wireless signals;
a first computer capable of wireless communication, wherein said first computer includes a first instance of switching software to assume control of said wireless I/O device;
and a second computer capable of wireless communication, wherein said second computer includes a second instance of switching software to acquire control of said wireless I/O device responsive to a request to switch control generated without a physical switching device.

14. The system of claim 13 wherein said first computer tranmits and receives commands and data with said wireless I/O device while said first computer is in control of said wireless I/O device.

15. The system of claim 14 wherein control of said first computer transmits a token to said second computer when said request to switch control is received at said first computer.

16. The system of claim 15 wherein said first computer gives up control of said wireless I/O device when said request to switch control is received at said first computer.

17. The system of claim 16 wherein said second computer takes control of said wireless I/O device when said token is received at said second computer.

* * * * *